US012380591B2

(12) United States Patent
Konemura

(10) Patent No.: US 12,380,591 B2
(45) Date of Patent: Aug. 5, 2025

(54) GENERATION OF TEACHING DATA INCLUDING IMAGE AND OBJECT INFORMATION INCLUDING CATEGORY, POSITION, SIZE, AND ORIENTATION OF OBJECT INCLUDED IN IMAGE

(71) Applicant: NEC Corporation, Tokyo (JP)

(72) Inventor: Hikaru Konemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 17/908,419

(22) PCT Filed: Mar. 27, 2020

(86) PCT No.: PCT/JP2020/014031
§ 371 (c)(1),
(2) Date: Aug. 31, 2022

(87) PCT Pub. No.: WO2021/192225
PCT Pub. Date: Sep. 30, 2021

(65) Prior Publication Data
US 2023/0143661 A1    May 11, 2023

(51) Int. Cl.
*G06T 7/70* (2017.01)
*G06T 3/02* (2024.01)
(Continued)

(52) U.S. Cl.
CPC .............. *G06T 7/70* (2017.01); *G06T 3/02* (2024.01); *G06T 3/20* (2013.01); *G06T 3/40* (2013.01);
(Continued)

(58) Field of Classification Search
None
See application file for complete search history.

(56) References Cited

U.S. PATENT DOCUMENTS 6,132,217 A * 10/2000 Dickson ................. G09B 23/04
434/211
11,373,026 B2 * 6/2022 Barr ....................... G06F 30/27
(Continued)

FOREIGN PATENT DOCUMENTS

JP    2006-338103 A    12/2006
JP    2011-039994 A     2/2011
(Continued)

OTHER PUBLICATIONS

International Search Report for PCT Application No. PCT/JP2020/014031, mailed on Jun. 16, 2020.
(Continued)

*Primary Examiner* — Tahmina N Ansari

(57) ABSTRACT

The first neural network is a learned neural network learned in such a way as to output, when an object image is input, a geometric transformation parameter relevant to the object image. The object image is an image of an object identified based on object information of the first teaching data including an image and the object information including a category, a position, and a size of an object included in the image. The calculation unit calculates an orientation of the object, based on the geometric transformation parameter being output from the first neural network. The generation unit generates, by adding the orientation of the object being calculated by the calculation unit to the first teaching data, second teaching data including an image and object information including a category, a position, a size, and an orientation of an object included in the image.

8 Claims, 22 Drawing Sheets

(51) Int. Cl.
    *G06T 3/20*    (2006.01)
    *G06T 3/40*    (2024.01)
    *G06T 3/60*    (2024.01)
    *G06T 7/62*    (2017.01)
    *G06V 10/82*    (2022.01)

(52) U.S. Cl.
    CPC ............... *G06T 3/60* (2013.01); *G06T 7/62* (2017.01); *G06V 10/82* (2022.01)

(56) References Cited

U.S. PATENT DOCUMENTS

| | | | | |
|---|---|---|---|---|
| 11,619,494 | B2* | 4/2023 | Wang | G01S 13/931 |
| | | | | 701/300 |
| 11,879,964 | B2* | 1/2024 | Wang | G06F 18/2415 |
| 11,906,441 | B2* | 2/2024 | Higa | G01N 21/8851 |
| 2011/0158542 | A1 | 6/2011 | Kato et al. | |
| 2012/0250982 | A1* | 10/2012 | Ito | G06T 7/194 |
| | | | | 382/159 |
| 2014/0324339 | A1* | 10/2014 | Adam | G01S 13/726 |
| | | | | 701/519 |
| 2015/0254532 | A1 | 9/2015 | Talathi et al. | |
| 2020/0034981 | A1 | 1/2020 | Torama | |
| 2021/0254982 | A1* | 8/2021 | Wang | G01C 21/28 |
| 2021/0264173 | A1* | 8/2021 | Wang | G01S 13/931 |
| 2023/0143661 | A1* | 5/2023 | Konemura | G06T 3/20 |
| | | | | 382/103 |

FOREIGN PATENT DOCUMENTS

| | | |
|---|---|---|
| JP | 2011-138388 A | 7/2011 |
| JP | 2017-515189 A | 6/2017 |
| JP | 2018-036848 A | 3/2018 |
| JP | 2019-164836 A | 9/2019 |
| JP | 2020-021170 A | 2/2020 |
| WO | 2018/163404 A1 | 9/2018 |

OTHER PUBLICATIONS

Kaito Fukuno, "Face Detection and Simultaneous Estimation of Face Attributes Using Single Shot Multibox Detector", 2018, pp. 1.

* cited by examiner

GENERATION OF TEACHING DATA INCLUDING IMAGE AND OBJECT INFORMATION INCLUDING CATEGORY, POSITION, SIZE, AND ORIENTATION OF OBJECT INCLUDED IN IMAGE

This application is a National Stage Entry of PCT/JP2020/014031 filed on Mar. 27, 2020, the contents of all of which are incorporated herein by reference, in their entirety.

TECHNICAL FIELD

The present invention relates to a teaching data conversion device, a teaching data conversion method, and a non-transitory storage medium.

BACKGROUND ART

Object detection for estimating, by using a neural network of, for example, deep learning and the like, a category, a position, and a size of an object included in an input image is known (Patent Literatures 1 and 2). The position and the size of the object detected in the object detection are identified based on a position and a size of a bounding box which is constituted of sides parallel to an outer frame of the input image and surrounds the detected object.

As a specific method of object detection, a single shot multibox detector (SSD), you only look once (YOLO), and the like are known.

CITATION LIST

Patent Literature

Patent Literature 1: Japanese Unexamined Patent Application Publication No. 2006-338103
Patent Literature 2: Japanese Unexamined Patent Application Publication No. 2011-138388

Non Patent Literature

Non Patent Literature 1: Kaito Fukuno, "Face Detection and Simultaneous Estimation of Face Attributes Using Single Shot Multibox Detector", 2018, (http://mprg.jp/data/FLABResearchArchive/Bachelor/B18/Abstract/fukuno.pdf)

SUMMARY OF INVENTION

Technical Problem

According to the object detection described above, when an estimation target image illustrated in FIG. 1 is input to an input layer of a neural network, a bounding box surrounding an object included in the estimation target image is output from an output layer of the neural network, as illustrated in FIG. 2. As illustrated in FIG. 2, when a longitudinal direction of the object is inclined with respect to an outer frame of the image, a large gap may be formed between the object and the bounding box. FIG. 3 illustrates an estimation result image acquired by rotating the bounding box in such a way that a long side of the bounding box illustrated in FIG. 2 becomes parallel to the longitudinal direction of the object, when the longitudinal direction of the object is successfully detected by using some method. Even in this case, a large gap is still formed between the object and the bounding box.

In addition, a technique of estimating an orientation as well as a category, a position, and a size of an object included in an input image, by adding an orientation of the object to teaching data to be used when learning a neural network, has been reported (Non Patent Literature 1). In this technique, as illustrated in FIG. 4, a bounding box rotated according to the orientation of the object can be directly estimated. However, manually adding an orientation of an object to a large amount of teaching data is burdensome and impractical.

In view of the above-described problems, an object of the present invention is to provide a technique for automatically adding an orientation of an object to teaching data.

Solution to Problem

According to an aspect of the present invention, provided is a teaching data conversion device including: a storage unit that stores a learned first neural network learned in such a way as to output, when an object image being an image of an object being identified based on object information of first teaching data including an image, and the object information including a category, a position, and a size of the object included in the image, is input, a geometric transformation parameter relevant to the object image; a calculation unit that calculates an orientation of the object, based on the geometric transformation parameter being output from the first neural network; and a generation unit that generates, by adding the orientation of the object being calculated by the calculation unit to the first teaching data, second teaching data including an image, and object information including a category, a position, a size, and an orientation of an object included in the image.

According to another aspect of the present invention, provided is a teaching data conversion method including: storing a learned first neural network learned in such a way as to output, when an object image being an image of an object being identified based on object information of first teaching data including an image, and the object information including a category, a position, and a size of the object included in the image, is input, a geometric transformation parameter relevant to the object image; calculating an orientation of the object, based on the geometric transformation parameter being output from the first neural network; and generating, by adding the orientation of the object being calculated by the calculation unit to the first teaching data, second teaching data including an image, and object information including a category, a position, a size, and an orientation of an object included in the image.

Advantageous Effects of Invention

According to the present invention, a technique for automatically adding an orientation of an object to teaching data is achieved.

EXAMPLE EMBODIMENT

First Example Embodiment

Hereinafter, a first example embodiment is described with reference to FIG. 5.

Figure 1:
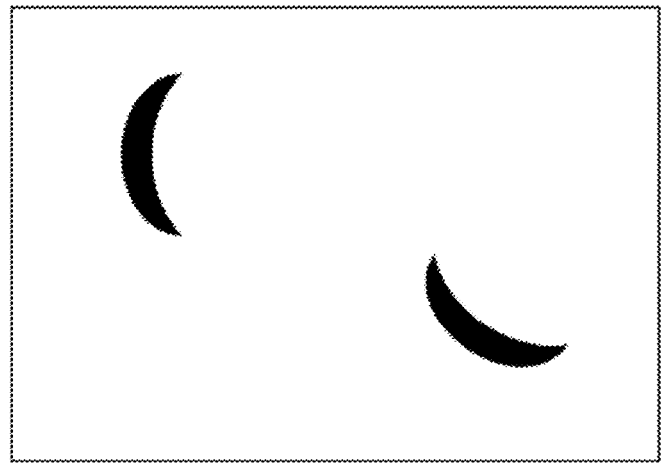
FIG. 1 illustrates an estimation target image.
Figure 2:
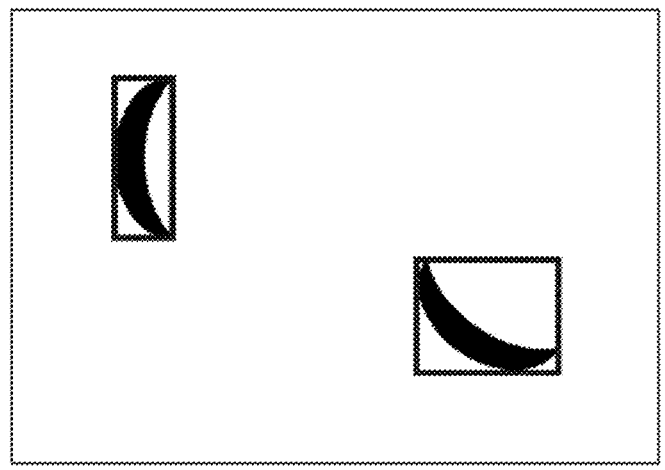
FIG. 2 is an estimation result image acquired with general object detection.
Figure 3:
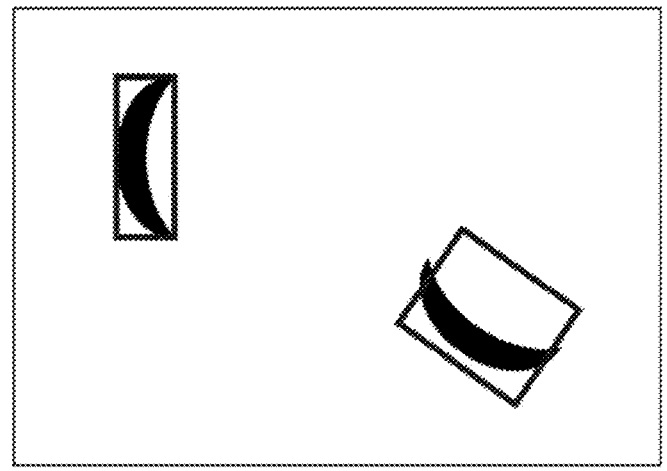
FIG. 3 is an estimation result image acquired by adding rotation to a bounding box.
Figure 4:
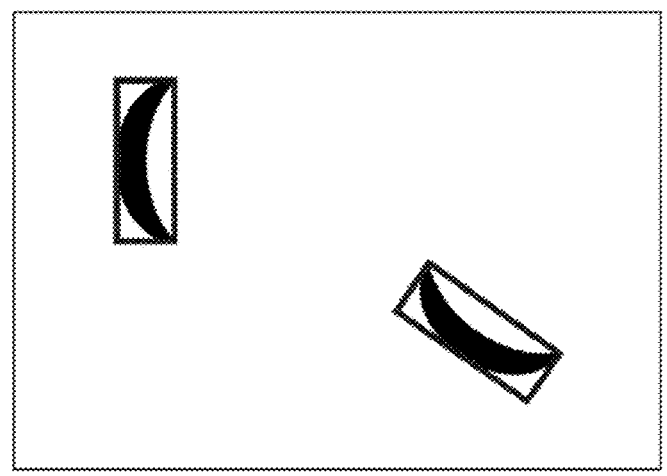
FIG. 4 is an estimation result image when an orientation of an object is directly estimated.
Figure 5:
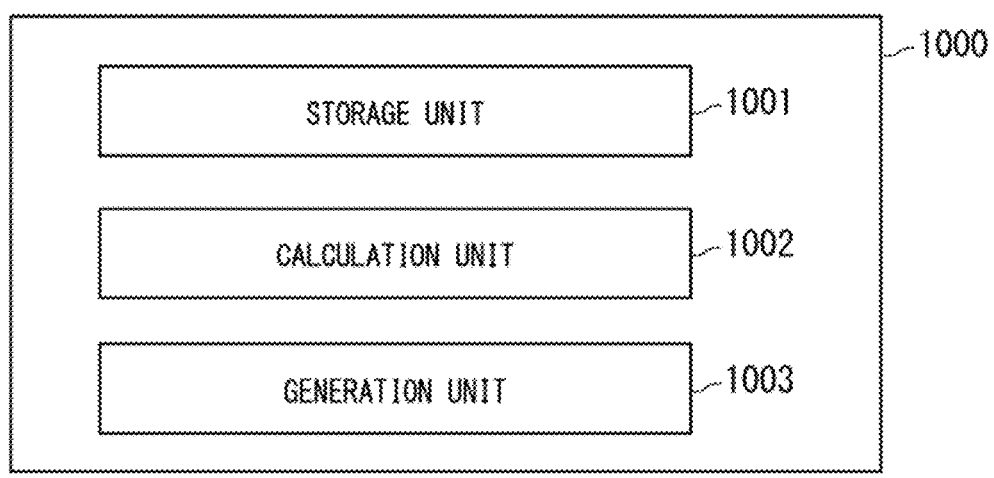
FIG. 5 is a functional block diagram illustrating a teaching data conversion device.

A teaching data conversion device 1000 illustrated in FIG. 5 includes a storage unit 1001, a calculation unit 1002, and a generation unit 1003.

The storage unit 1001 stores a first neural network. The first neural network is a learned neural network that is learned in such a way as to output, when an object image is input, geometric transformation parameter relevant to the object image. The object image is an image of an object identified based on object information of first teaching data including: an image; and the object information including a category, a position, and a size of the object included in the image.

The calculation unit 1002 calculates an orientation of the object, based on the geometric transformation parameter output from the first neural network.

The generation unit 1003 adds the orientation of the object calculated by the calculation unit 1002 to the first teaching data, and thereby generates second teaching data including: an image; and object information including a category, a position, a size, and an orientation of an object included in the image.

According to the above configuration, a technique of automatically adding an orientation of an object to teaching data is achieved.

Second Example Embodiment

Next, a second example embodiment is described. For convenience of description, the same functional blocks may be denoted by different reference signs.

The second example embodiment relates to an object detection technique for estimating, by using a neural network, in particular, deep learning, a category, a position, and a size of an object included in an image. More specifically, in this object detection technique, after adding orientation information of the object to an output of the neural network, a bounding box rotated in accordance with the orientation of the object is directly estimated by learning teaching data including an orientation of the object. In the second example embodiment, a network (hereinafter referred to as a self-learning geometric transformer), which is represented by spatial transformer networks (http://papers.nips.cc/paper/5854-spatial-transformer-networks.pdf), for estimating a geometric transformation parameter used in spatial correction of an image is introduced. Specifically, the following steps are added to the object detection technique.

(1) A step of learning a self-learning geometric transformer that outputs an image after spatial correction and a correction parameter by using, as input data, teaching data having object information that is used in general object detection, including a category, a position, and a size of an object.

(2) A step of applying the learned self-learning geometric transformer to the teaching data having category, position, and size information of the object and thereby generating teaching data having object information including a position, a size, and an orientation of the object.

Hereinafter, four broad phases are described with reference to the drawings.

(Learning Phase)

A phase in which a method of image correction according to an orientation of an object is learned from first teaching data having: an image created in advance by a user; and category, position, and size information of an object relevant to the image.

(Teaching Data Conversion Phase)

A phase in which orientation information of the object is derived from the learned image correction method, and the first teaching data is converted into second teaching data by using the orientation information.

(Object Detector Learning Phase)

A phase in which an object detector by using the converted second teaching data.

(Estimation Phase)

A phase in which object detection is performed by using the learned object detector (a learned model).

Figure 6:
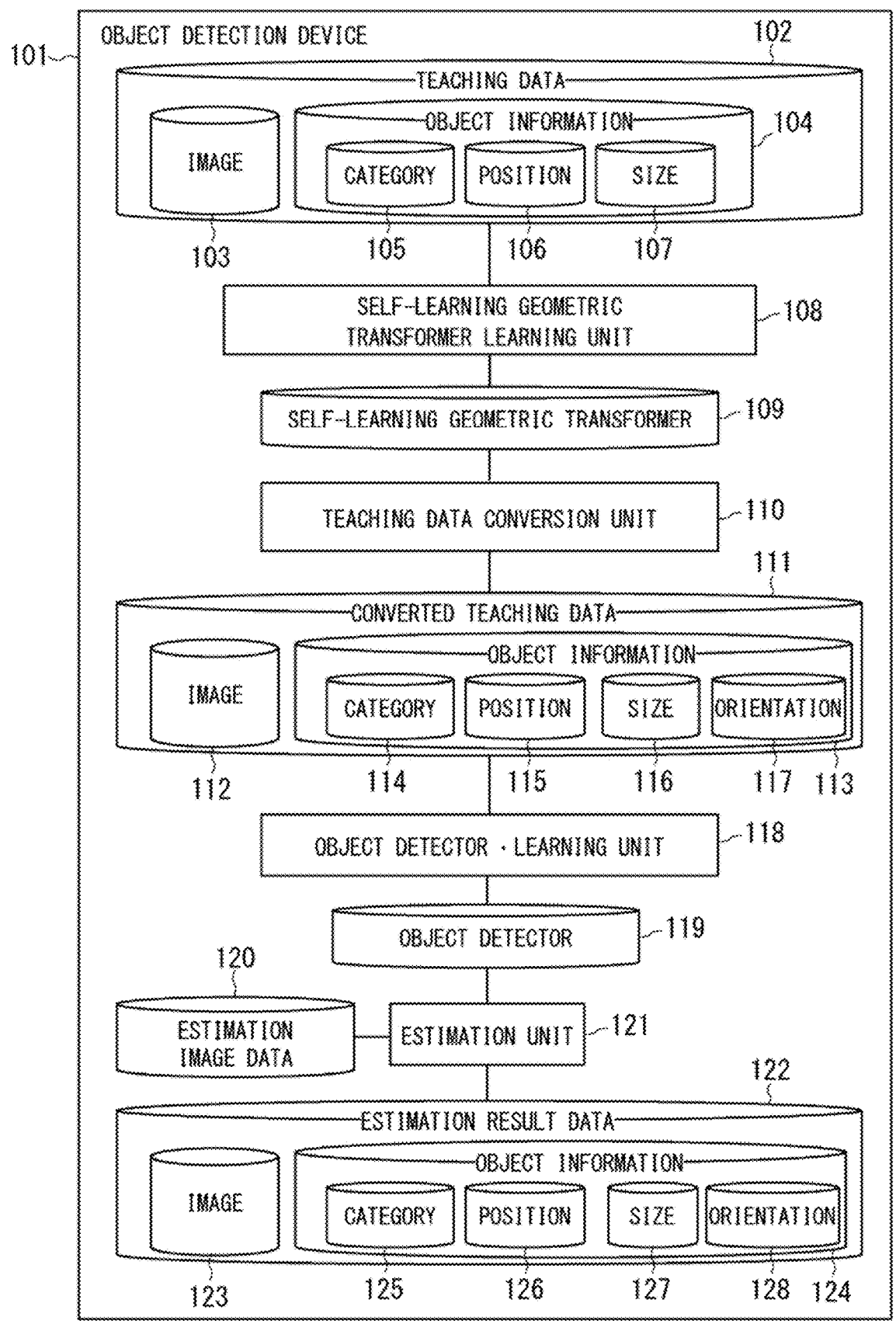
FIG. 6 is a functional block diagram illustrating an object detection device.

FIG. 6 is a configuration diagram of an object detection device 101.

The object detection device 101 (a teaching data conversion device) includes a self-learning geometric transformer learning unit 108 (a learning unit), a teaching data conversion unit 110 (a generation unit), an object detector learning unit 118, and an estimation unit 121.

The self-learning geometric transformer learning unit 108 learns, by using teaching data 102 (first teaching data) including an image 103 and including, as object information 104 relevant to the image, a category 105, a position 106 (center coordinates cx, cy of a bounding box), and a size 107 (scales w, h of the bounding box) of an object, a geometric transformation method for capturing a feature of an object.

The teaching data conversion unit 110 performs processing of adding orientation information 117 to the object information 104 of the teaching data (the first teaching data) by using self-learning geometric transformer 109 (a storage unit) after learning.

The object detector learning unit 118 learns an object detector by using converted teaching data 111.

The estimation unit 121 performs estimation on an estimation image data 120 by using the learned object detector 119.

Figure 7:
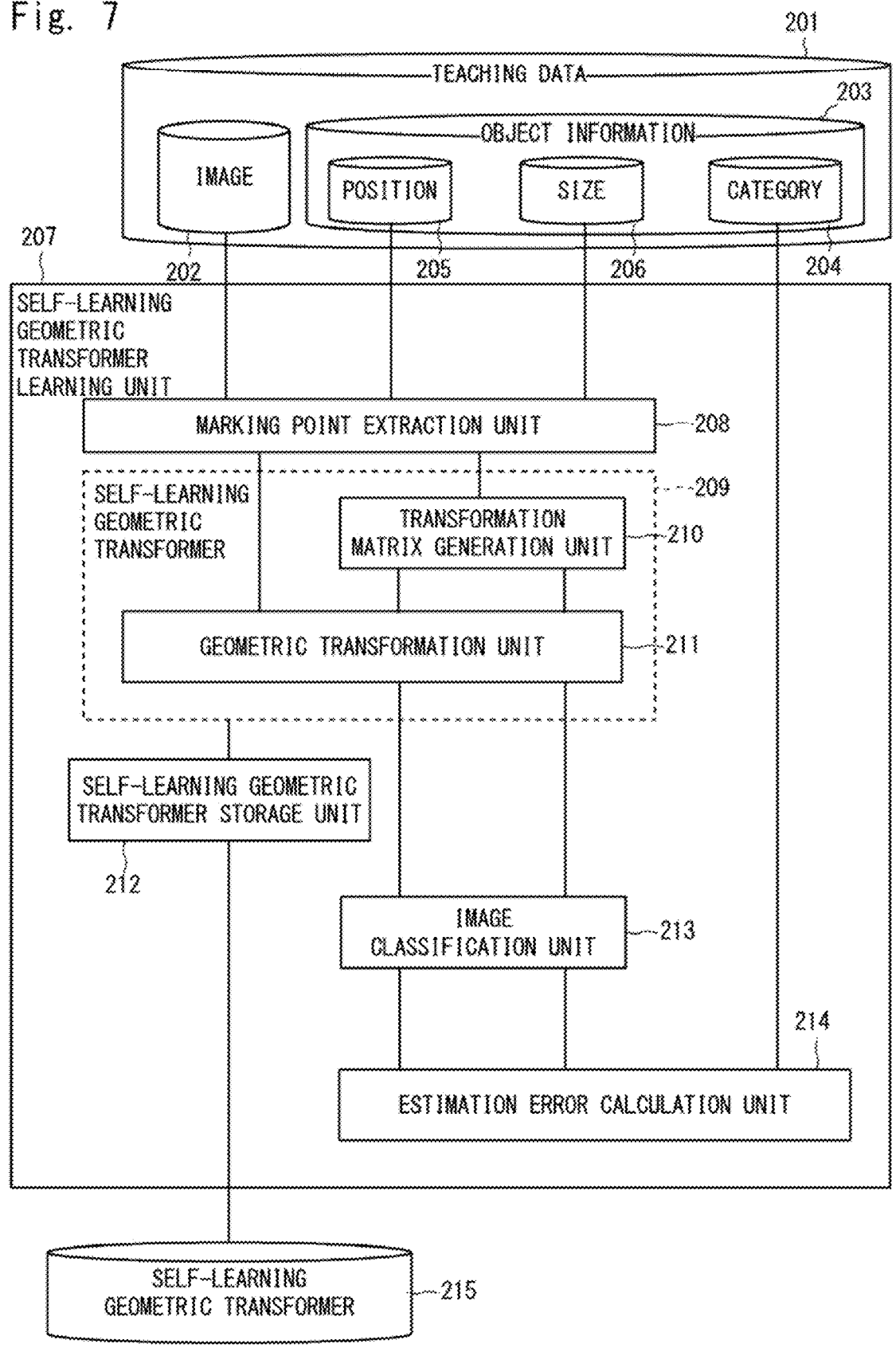
FIG. 7 is a functional block diagram illustrating a self-learning geometric transformer learning unit.

FIG. 7 is a configuration diagram illustrating the self-learning geometric transformer learning unit 108.

A self-learning geometric transformer learning unit 207 includes a marking point extraction unit 208, a transformation matrix generation unit 210, a geometric transformation unit 211, a self-learning geometric transformer storage unit 212, an image classification unit 213, and an estimation error calculation unit 214.

The marking point extraction unit 208 extracts a marking point of an object from the created teaching data 201 (the first teaching data).

The transformation matrix generation unit 210 calculates a transformation matrix from a small image acquired by extracting the marking point. The transformation matrix generation unit 210 corresponds to a localisation network of spatial transformer networks.

The geometric transformation unit 211 applies geometric transformation to the small image acquired by extracting the marking point, and outputs an image after the transformation. The geometric transformation unit 211 corresponds to a grid generator and a sampler of the spatial transformer networks.

The self-learning geometric transformer storage unit 212 performs storage processing of a self-learning geometric transformer that has completed to be learned. The self-learning geometric transformer storage unit 212 stores a learned self-learning geometric transformer 209 (a first neural network) as a self-learning geometric transformer 215 (a storage unit).

The image classification unit 213 (a second neural network) performs image classification on the image output from the geometric transformation unit and outputs an estimated value.

The estimation error calculation unit 214 calculates an estimation error from the estimated value (a category) output from the image classification unit 213 and category information 204 of the teaching data, and causes parameters of the image classification unit 213 and the self-learning geometric transformer 209 to be updated.

Figure 8:
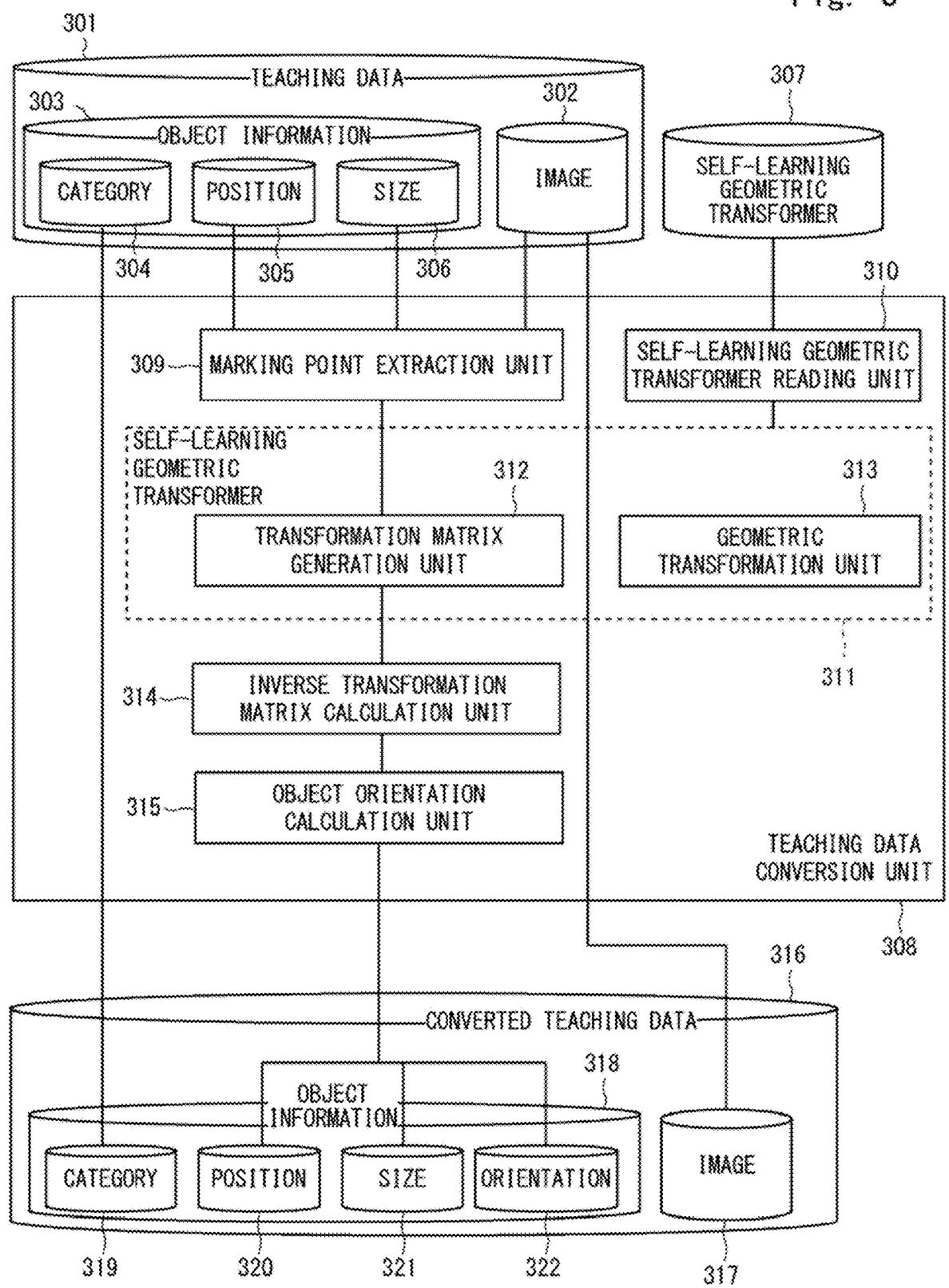
FIG. 8 is a functional block diagram of a teaching data conversion unit.

FIG. 8 is a configuration diagram illustrating a configuration within the teaching data conversion unit 110.

A teaching data conversion unit 308 includes a marking point extraction unit 309, a self-learning geometric transformer reading unit 310, an inverse transformation matrix calculation unit 314, and an object orientation calculation unit 315 (a calculation unit).

The marking point extraction unit 309 extracts a marking point of an object from created teaching data 301.

The self-learning geometric transformer reading unit 310 reads a learned self-learning geometric transformer 311 including a transformation matrix generation unit 312 and a geometric transformation unit 313.

The inverse transformation matrix calculation unit 314 calculates an inverse transformation matrix (inverse geometric transformation matrix) with respect to a transformation matrix (a geometric transformation matrix) output from the transformation matrix generation unit 312.

The object orientation calculation unit 315 (a calculation unit/the generation unit) newly calculates an orientation while correcting a position and a of the object by using the inverse transformation matrix, and stores, as information, a position (center coordinates cx, cy of a bounding box) 320, a size (scales w, h of the bounding box) 321, and the orientation (an orientation θ of the bounding box) 322 of the object of converted teaching data.

Figure 9:
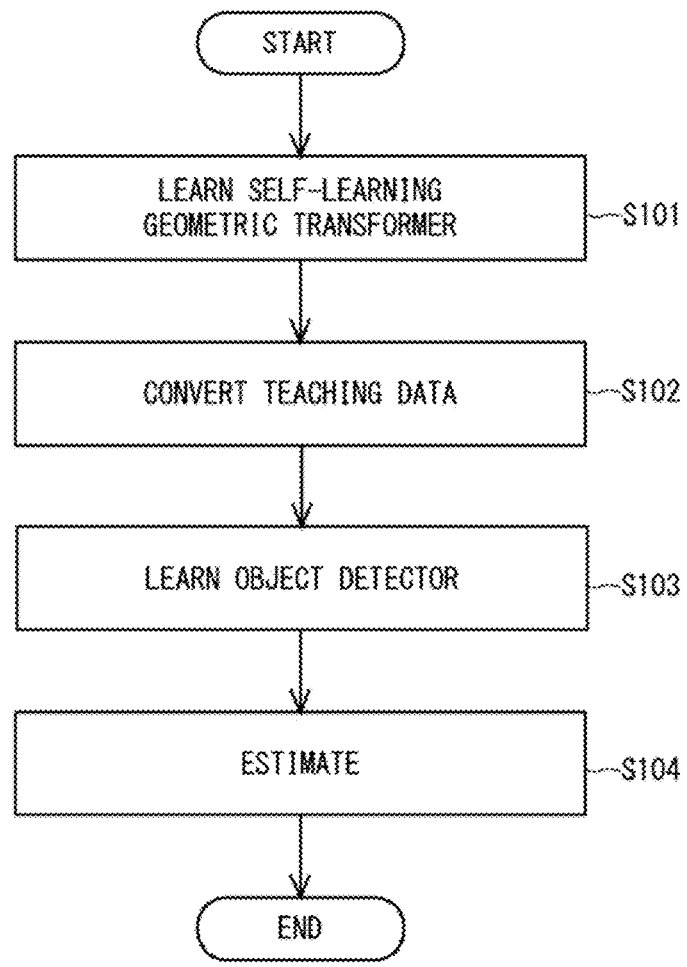
FIG. 9 is a flowchart illustrating an overall operation.

FIG. 9 is a flowchart illustrating an example of an overall processing from processing of adding orientation information to teaching data prepared by a user to actually performing object detection estimation.

Figure 10:
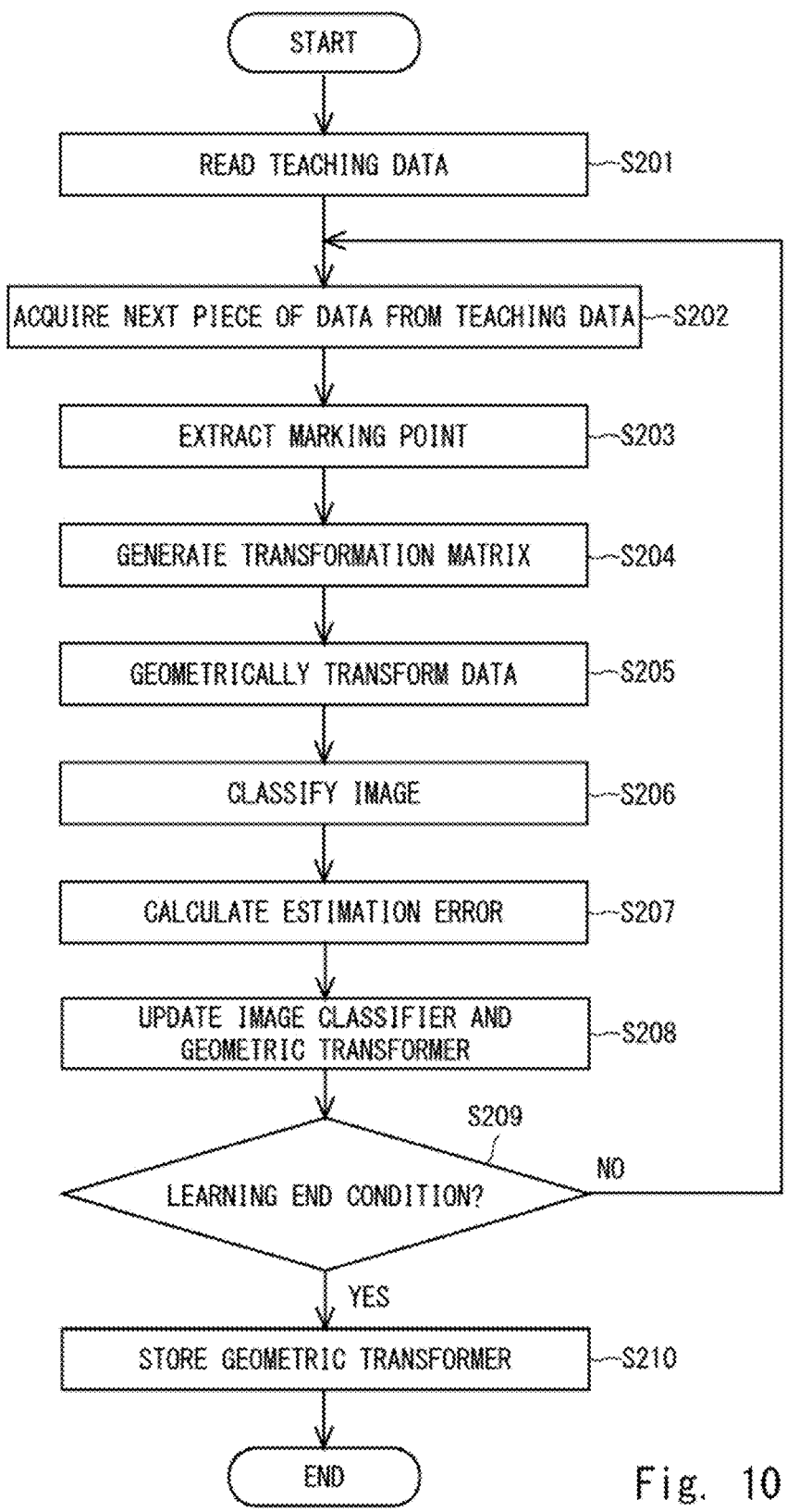
FIG. 10 illustrates an operation flow of the self-learning geometric transformer learning unit.
Figure 11:
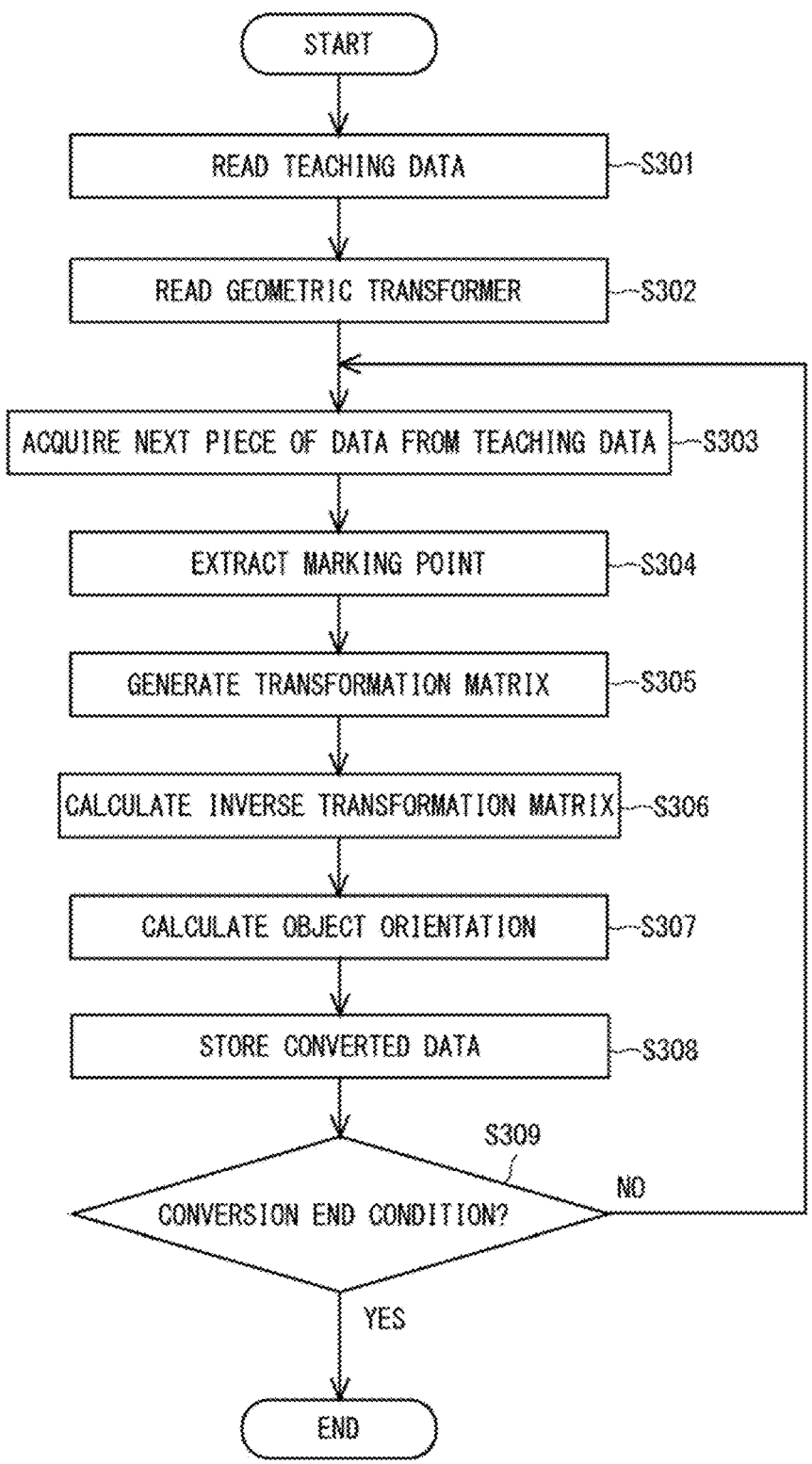
FIG. 11 illustrates an operation flow of the teaching data conversion unit.
Figure 12:
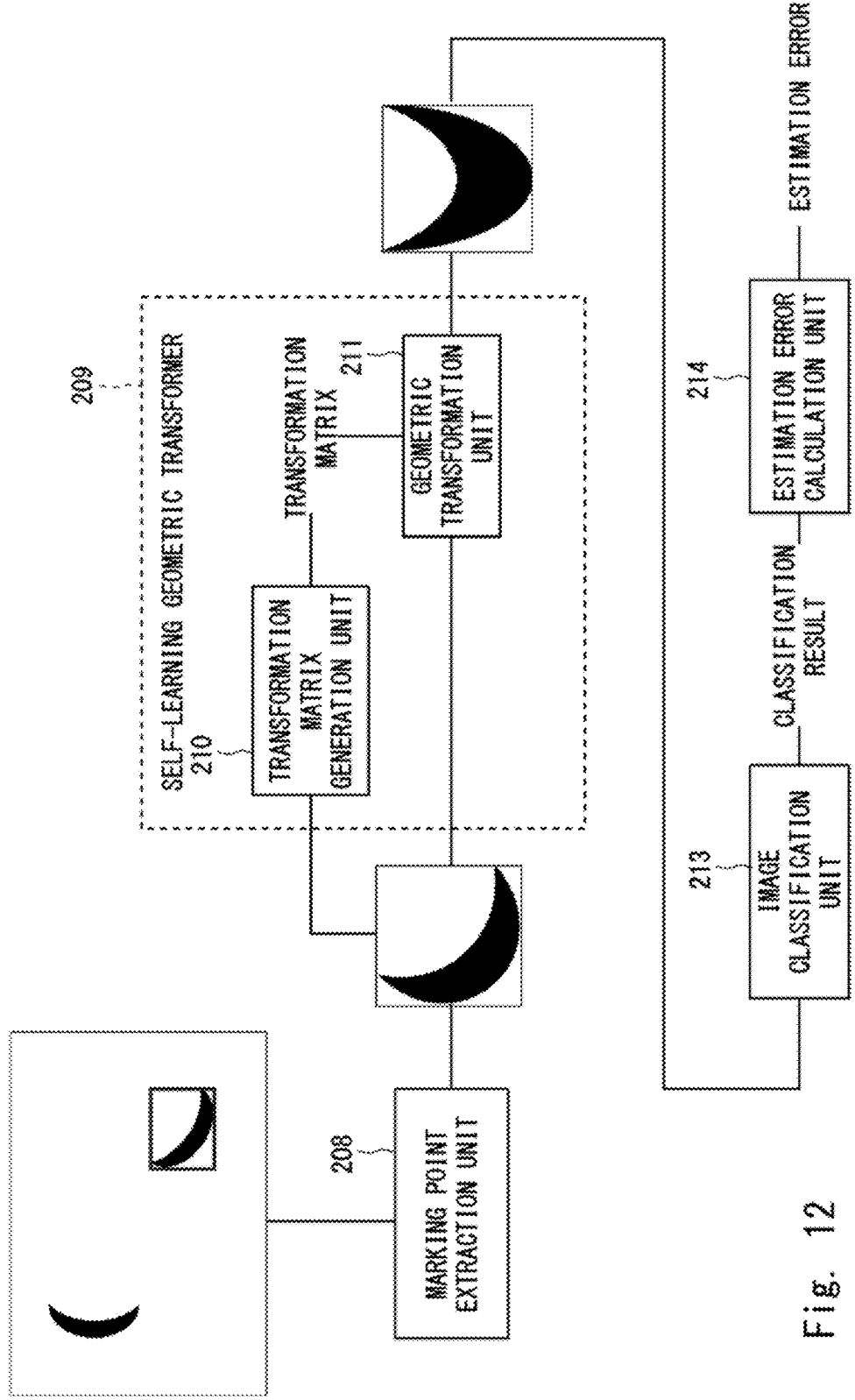
FIG. 12 is an explanatory diagram illustrating learning of a self-learning geometric transformer.
Figure 13:
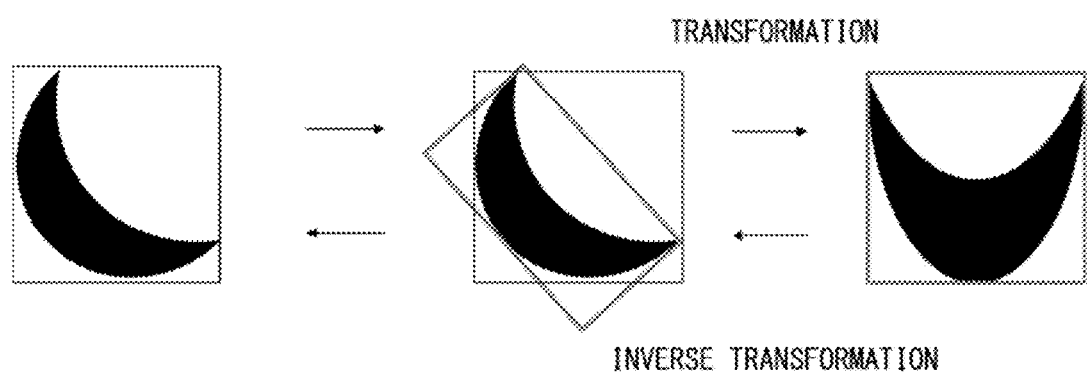
FIG. 13 is an explanatory diagram illustrating geometric transformation.
Figure 14:
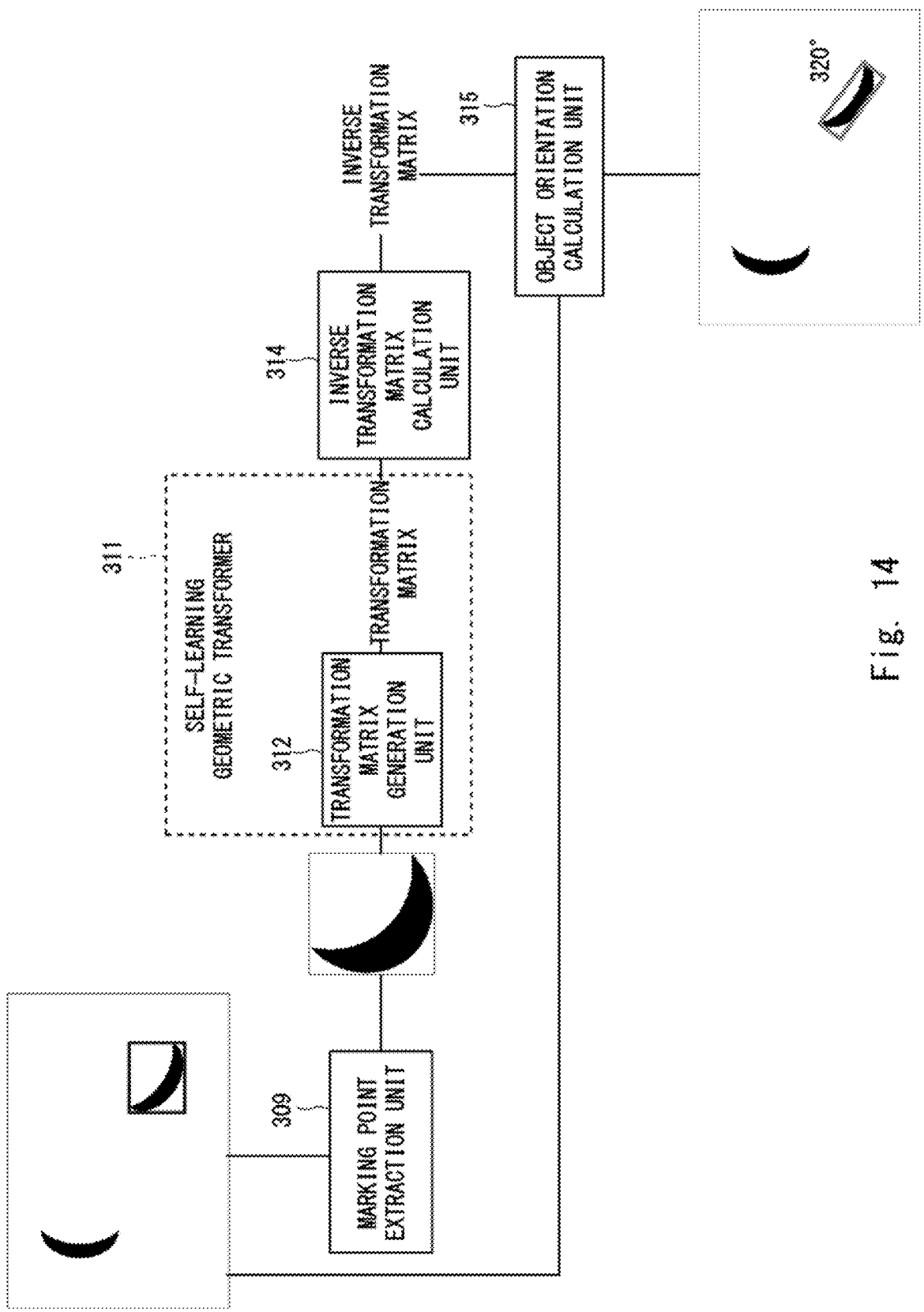
FIG. 14 is an explanatory image of teaching data conversion.

FIG. 10 is a flowchart detailing a self-learning geometric transformer learning step S101 in the above-described overall processing flow. FIG. 11 is a flowchart detailing the teaching data conversion step S102 in the above-described overall processing flow. FIG. 12 is a supplementary material of the above-described self-learning geometric transformer learning step. FIG. 13 is a supplementary material of geometric transformation performed on an image during the flow. FIG. 14 is a supplementary material of the above-described teaching data conversion step.

Description is made in accordance with the configuration diagram and the above-described flowcharts, by using the supplementary materials as appropriate.

First, the overall flow is described.

It is assumed that a user preliminarily prepares the teaching data 102 including: the image 103; and the object information 104.

In step S101, the user inputs the teaching data 102 to the self-learning geometric transformer learning unit 108. In the self-learning geometric transformer learning unit 108, a self-learning geometric transformer 108 learns a method of correcting the input data, and the model 109 that has reached an end condition is stored.

In step S102, the user inputs the learned self-learning geometric transformer 109 and the teaching data 102 to the teaching data conversion unit 110, and can thereby acquire the new teaching data 111 including orientation information of an object. In the teaching data 111, not only the orientation 117 of the object is added to the original teaching data 101, but also a position 115 and a size 116 are corrected.

In step S103, the user inputs the converted teaching data 111 to the object detector learning unit 118. In the object detector learning unit 118, the object detector 119 learns information on the category, position, size, and orientation of the object, and the object detector 119 that has reached an end condition is stored. As a method of learning the object detector 119 in consideration of orientation, Non-Patent Literature 1 is used as an example.

In step S104, the user performs object detection on the image data 120 for estimation by using the learned object detector 119. The input image data 120 is estimated for a category, a position, a size, and an orientation of an object included in an image, and an estimation result is output in a form of a bounding box or the like. As an example of an object detection method in which an orientation is considered, Non Patent Document 1 is used.

The learning of the self-learning geometric transformer 109 is described in more detail.

In step S201, the teaching data 201 input from the user is read into the self-learning geometric transformer learning unit 108. In FIG. 12, an image capturing a crescent-shaped object is input to the self-learning geometric transformer learning unit 108.

In step S202, the marking point extraction unit 208 acquires one piece of object information 203 from the teaching data 201. In FIG. 12, object information of an object captured at lower right of the input image is acquired.

In step S203, the marking point extraction unit 208 cuts out a small image (an object image) of a position of the object, based on a position 205 and a size 206 of the object information. Note that, in FIG. 12, aspect ratio changing processing is performed in such a way that the cut-out image becomes a square, but depending on an input method to the self-learning geometric transformer 209, the aspect ratio changing processing may not necessarily be performed.

When the small image is input to the self-learning geometric transformer 209, first, the small image is passed to the transformation matrix generation unit 210, step S204 is performed, and a transformation matrix is output. In the following, affine transformation is described as an example, but a transformation technique other than the affine transformation is also applicable as described in the paper on spatial transformer networks.

In step S205, the geometric transformation unit 211 applies the transformation matrix to the small image and performs geometric transformation of data. FIG. 13 is an image of the geometric transformation, in which a center thick frame part is focused on a small image on left, and geometric transformation such as enlargement, reduction, rotation, and translation is performed on coordinates of the thick frame part in such a way as that the small image on the left is transformed into a small image on right.

In step S206, image classification estimation is performed on the geometrically transformed small image by using the image classification unit 213.

In step S207, the estimation error calculation unit 214 calculates, based on an estimation result (a classification result) output from the image classification unit 213 and the category information 204 of the teaching data 201, an error in the estimation results.

In step S208, an image classifier 213 and the self-learning geometric transformer 209 are updated based on the estimation error output from the estimation error calculation unit 214, in such a way as to reduce the estimation error. The image classifier 213 and the self-learning geometric transformer 209 are both constituted of neural networks, and updating the image classifier 213 and the self-learning geometric transformer 209 means updating weighting coefficients of the neural networks constituting the image classifier 213 and the self-learning geometric transformer 209.

In step S209, it is checked whether a learning end condition has been reached. The processing from step S202 to step S208 is repeated until the end condition is reached.

In step S210, the self-learning geometric transformer storage unit 212 stores the self-learning geometric transformer 209 that has completed to be learned. Note that, the image classifier 213 is installed for learning of the self-learning geometric transformer 209, and may not necessarily be stored. Also in the present example embodiment, a flow in which the storage is not performed is described.

Next, conversion of the teaching data 301 is described in more detail.

In step S301, the teaching data 301 input from the user is read into the teaching data conversion unit 308. In FIG. 14, an image capturing a crescent-shaped object is input.

In step S302, the self-learning geometric transformer 311 stored in step S210 is read into the teaching data conversion unit 308.

In step S303, one piece of object information 303 is selected from the teaching data 301. In FIG. 14, the object information of an object captured at lower right of the input image and indicated by a thick frame is selected.

In step S304, a small image of an object position is cut out based on a position 305 and a size 306 of the object information. In FIG. 14, aspect ratio changing processing is performed in such a way that the cut-out image becomes a square, but, as in step S203, depending on an input method to the self-learning geometric transformer 311, the aspect ratio changing processing may not necessarily be performed.

When the small image is input to the self-learning geometric transformer 311, first, the small image is passed to the transformation matrix generation unit 312, step S305 is performed, and a transformation matrix is output. Although affine transformation is described below as an example, as in S204, a transformation method other than the affine transformation can be applied as described in the paper on spatial transformer networks. Note that, unlike S204, geometric transformation itself is not necessary at a time of converting teaching data, and therefore the geometric transformation unit 313 is not used.

In step S306, the transformation matrix output in step S305 is input to the inverse transformation matrix calculation unit 314 and an inverse matrix is calculated.

In step S307, orientation information of the object is calculated by the object orientation calculation unit 315 by using the inverse transformation matrix calculated in step S306. First, as illustrated in FIG. 13, coordinates of a thick frame in a center image can be calculated by performing inverse transformation on coordinates of four corners of a thick frame in a small image on right. On the basis of this coordinate value, the position and the size of the object are corrected. An orientation of the object is determined in the following steps. First, a rotation angle in the inverse transformation matrix is acquired. The affine transformation generally results in a product of each of an enlargement/reduction matrix, a rotation matrix, and a translation matrix. Therefore, by decomposing the inverse transform matrix into these three kinds of matrices and acquiring an angle of the rotation matrix, the rotation angle at a time of transformation to the thick frame can be acquired.

Figure 15:
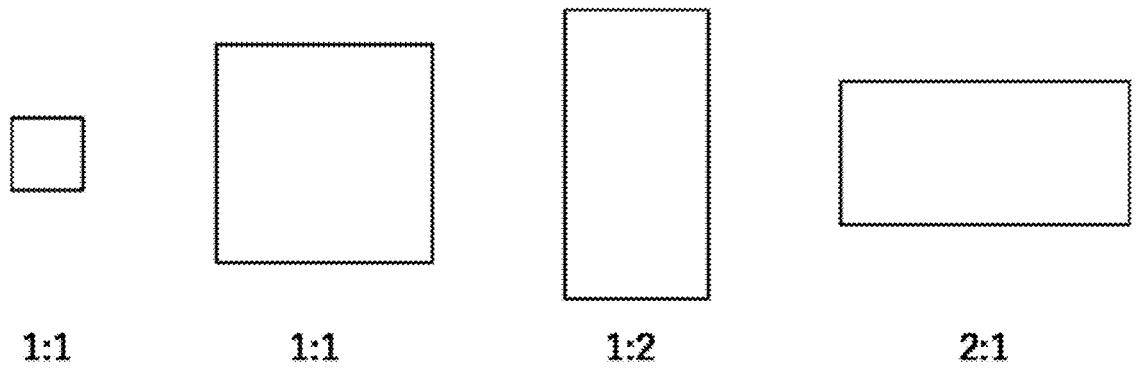
FIG. 15 illustrates an example of setting a default box by using a general SSD in which an orientation of an object is not considered.
Figure 16:
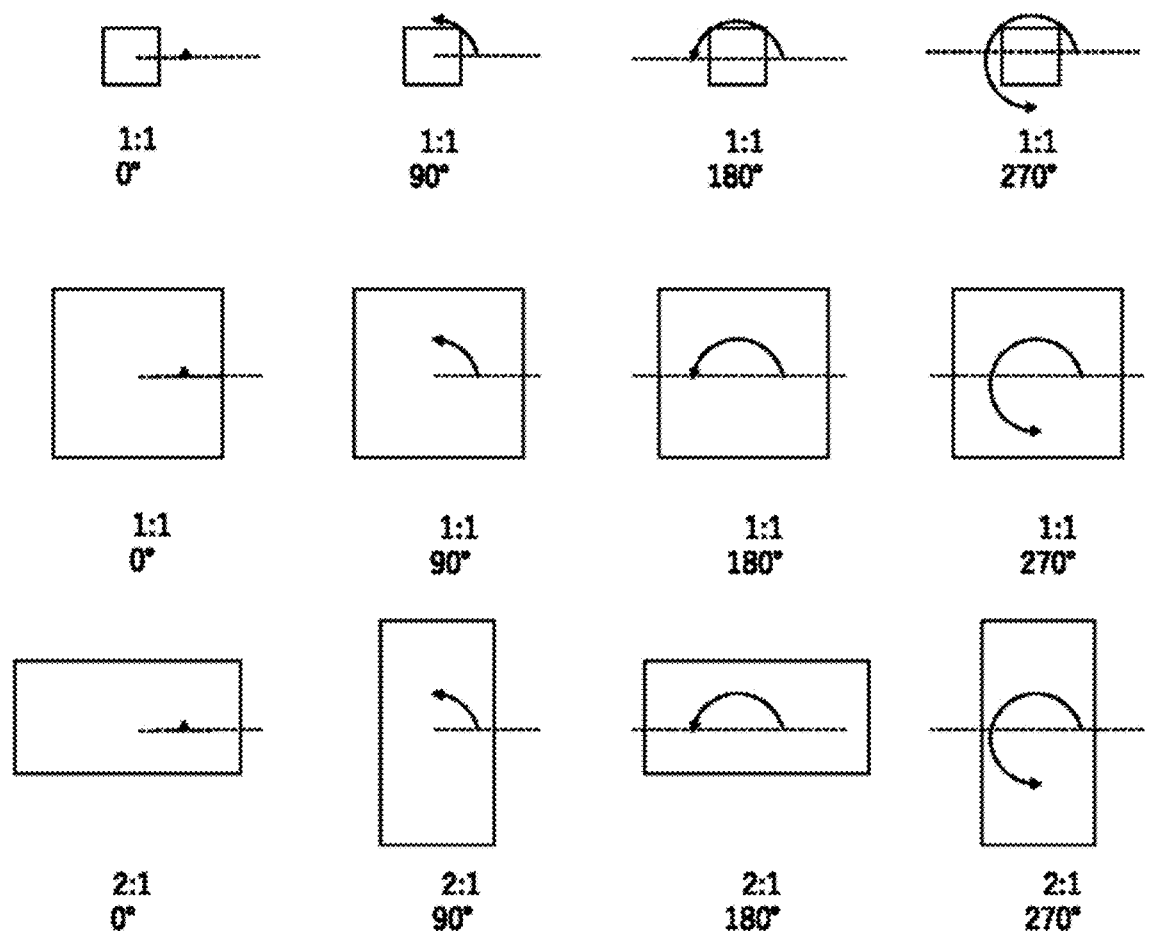
FIG. 16 illustrates an example of setting a default box by using a SSD in which an orientation of an object is considered.

Next, an inclination angle of the thick frame is determined based on a definition. The following is an example of the definition in a case in which an SSD is employed as the object detector 119. In general, the SSD estimates an amount of translation and an enlargement/reduction ratio with respect to a plurality of default boxes having different aspect ratios as illustrated in FIG. 15. Meanwhile, in the present example embodiment, a SSD in which an orientation of an object is considered is employed, and an amount of translation, an enlargement/reduction ratio, and an angle with respect to default boxes having different angles as well as different aspect ratios as illustrated in FIG. 16 are estimated. Here, the angle is defined as an inclination angle of a long side of the default box, as illustrated in FIG. 16.

A definition of an inclination angle of the thick frame of the center image in FIG. 13 is defined as an angle of a long side, as in FIG. 16.

Figure 17:
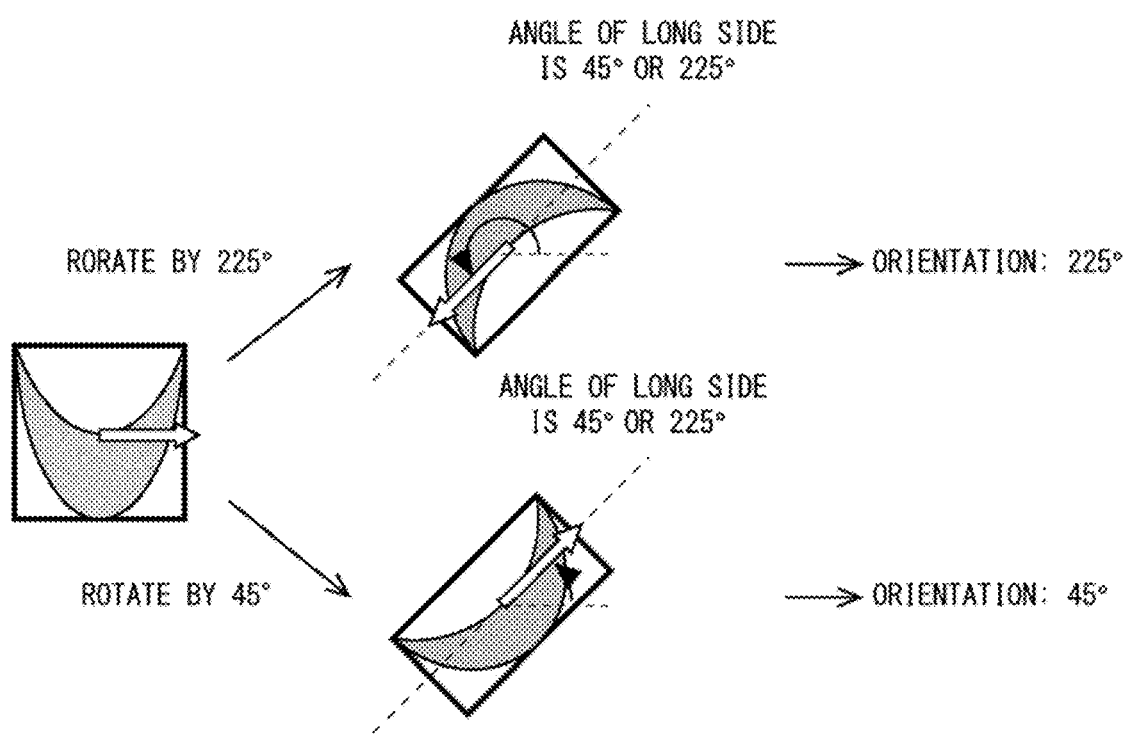
FIG. 17 is an explanatory diagram illustrating a method of determining a rotation angle in a case in which a horizontal side is a long side.
Figure 18:
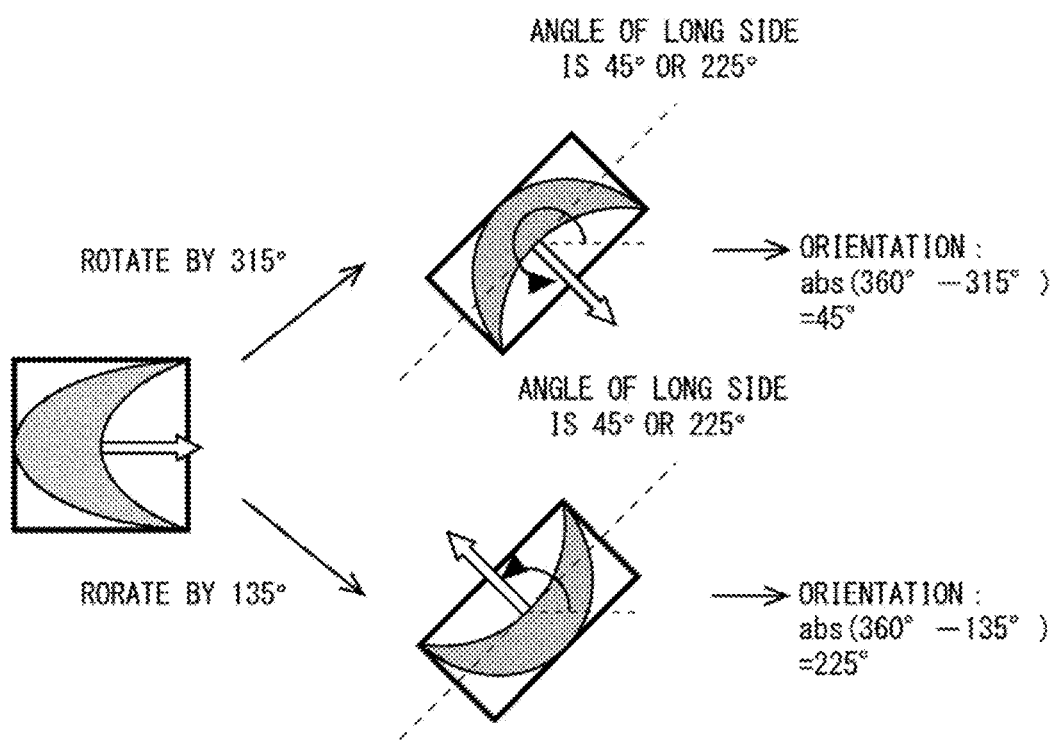
FIG. 18 is an explanatory diagram illustrating a method of determining a rotation angle in a case in which a vertical side is a long side.
Figure 19:
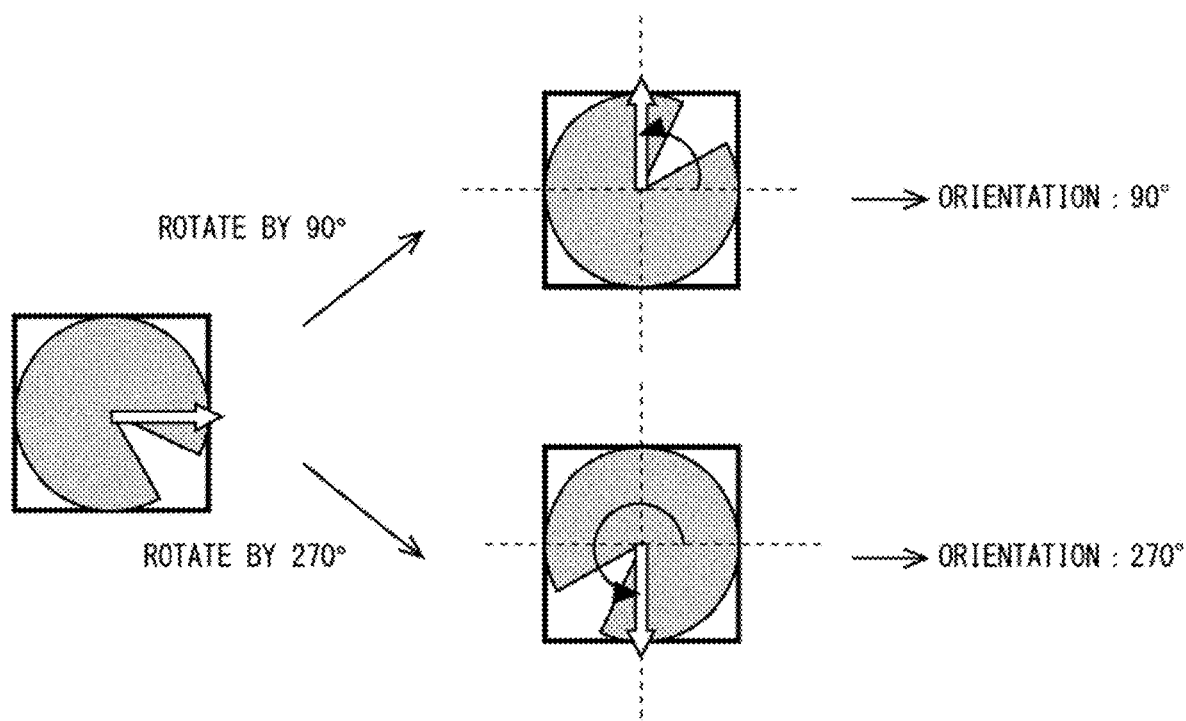
FIG. 19 is an explanatory diagram illustrating a method of determining a rotation angle in a case in which a vertical side and a horizontal side are equal to each other.

Here, in order to distinguish which of two long sides of the thick frame corresponds to an upper side of the object, it is necessary to determine which of a vertical side and a horizontal side of the thick frame illustrated on the right in FIG. 13 is a long side, and to determine the angle, as illustrated in FIGS. 17 to 19 as one example. In FIGS. 17 to 19, it is checked which of the vertical side and the horizontal side is transformed into the long side, and the angle is determined. In FIG. 17, since the horizontal side is transformed to the long side, the rotation angle of the inverse transformation matrix represents an angle of the long side. Meanwhile, in FIG. 18, since the vertical side is converted to the long side, the rotation angle of the inverse transformation matrix represents an angle of a short side. In the figures, in order to convert to the angle of the long side, a value acquired by subtracting the rotation angle of the inverse transformation matrix from 360° is used as the angle of the long side. Since FIG. 19 is in a square state, the rotation angle of the inverse transformation matrix can be regarded as equal to the angle of the long side, as in FIG. 17.

In step S308, one piece of data converted in step S307 is stored as converted teaching data 316.

In step S309, it is checked whether the conversion processing is performed on all pieces of the teaching data. When there are data for which the processing has not been completed yet, the processing is continued from S302. When the conversion processing is performed on all pieces of the teaching data, the processing is terminated.

As described above, in a method of directly estimating, by adding orientation information of an object to an output from a neural network and learning teaching data including the orientation information of the object, a bounding box rotated in accordance with an orientation of the object, new teaching data further including orientation information of the object can be automatically generated from teaching data that is used in general object detection, having category information, position information, and size information of the object. This method of directly estimating the bounding box is a technique of estimating, by using a neural network, especially by using deep learning, a category, a position, a size of an object included in an image. Since it is not necessary to include the orientation information in the teaching data in advance, the burden of creating the teaching data by the user is small.

The preferable example embodiments have been described above, and the above-described example embodiments have the following features.

The object detection device 101 (teaching data conversion device) includes the self-learning geometric transformer 109 (the storage unit), the object orientation calculation unit 315 (the calculation unit), and the teaching data conversion unit 308 (the generation unit).

For example, the self-learning geometric transformer 109 as the storage unit configured of a RAM, a ROM, or the like stores a learned self-learning geometric transformer (the first neural network) learned in such a way as to output, when an object image, which is an image of an object identified based on the object information 303 of the teaching data 301 (the first teacher data) including: an image; and the object information including a category, a position, and a size of an object included in the image is input, a geometric transformation parameter relevant to the object image.

The object orientation calculation unit 315 calculates an orientation of the object, based on the geometric transformation parameter output from the self-learning geometric transformer 109.

The teaching data conversion unit 308 adds the orientation of the object calculated by the object orientation calculation unit 315 to the teaching data 301, and thereby generates the converted teaching data 316 (the second teaching data) including: an image; and object information including a category, a position, a size, and the orientation of the object in the image.

According to the above-described method, a technique for automatically adding the orientation of the object to the teaching data 301 is achieved.

The object detection device 101 further includes the self-learning geometric transformer learning unit 108 that generates a self-learning geometric transformer by learning. The self-learning geometric transformer learning unit 108 inputs the object image to the self-learning geometric transformer 109, and thereby geometrically transforms the object image, based on the geometric transformation parameter output from the self-learning geometric transformer 109. The self-learning geometric transformer learning unit 108 calculates an estimation error between a category output from the image classification unit 213 by inputting the geometrically transformed object image to the image classification unit 213 (the second neural network) and the category included in the teaching data 301. The self-learning geometric transformer learning unit 108 learns the self-learning geometric transformer 109 by updating weighting coefficients of the self-learning geometric transformer 109 and the image classification unit 213 in such a way that the estimation error becomes small.

The geometric transformation parameter is a parameter for rotating the object image.

The geometric transformation parameter is further a parameter for executing at least one of enlarging, reducing, and translating on the object image.

The geometric transformation parameter is a parameter for affine transformation of the object image.

The geometric transformation parameter is a geometric transformation matrix. The object orientation calculation unit 315 calculates an orientation of the object, based on an inverse geometric transformation matrix that is an inverse matrix of the geometric transformation matrix.

In the teaching data conversion method, the learned self-learning geometric transformer 109 (the first neural network) learned in such a way as to output, when an object image, which is an image of an object identified based on object information of the teaching data 301, is input, a geometric transformation parameter relevant to the object image is stored. In the teaching data conversion method, an orientation of the object is calculated based on the geometric transformation parameter output from the self-learning geometric transformer 109. In the teaching data conversion method, by adding the calculated orientation of the object to the teaching data 301, the converted teaching data 111 (the second teaching data) including: an image; and object information including a category, a position, a size, and the orientation of the object included in the image is generated. According to the above-described method, a technique for automatically adding the orientation of the object to the teaching data 301 is achieved.

The above-described teaching data conversion method can be executed by a computer. Specifically, when a CPU of the computer reads and executes a program stored in a ROM of the computer, the program causes the computer to execute a teaching data generation method. The program may be stored in a non-transitory storage medium.

The above-described example embodiment can be modified as follows.

Modification Example 1

Specifically, by preparing the self-learning geometric transformer 109 for each detection target category, it is possible to learn a conversion method for each category with higher accuracy. Since a position, a size, and an orientation of an object can be captured more accurately, improvement in quality of teaching data after conversion and improvement in the object detection accuracy can be expected.

Figure 20:
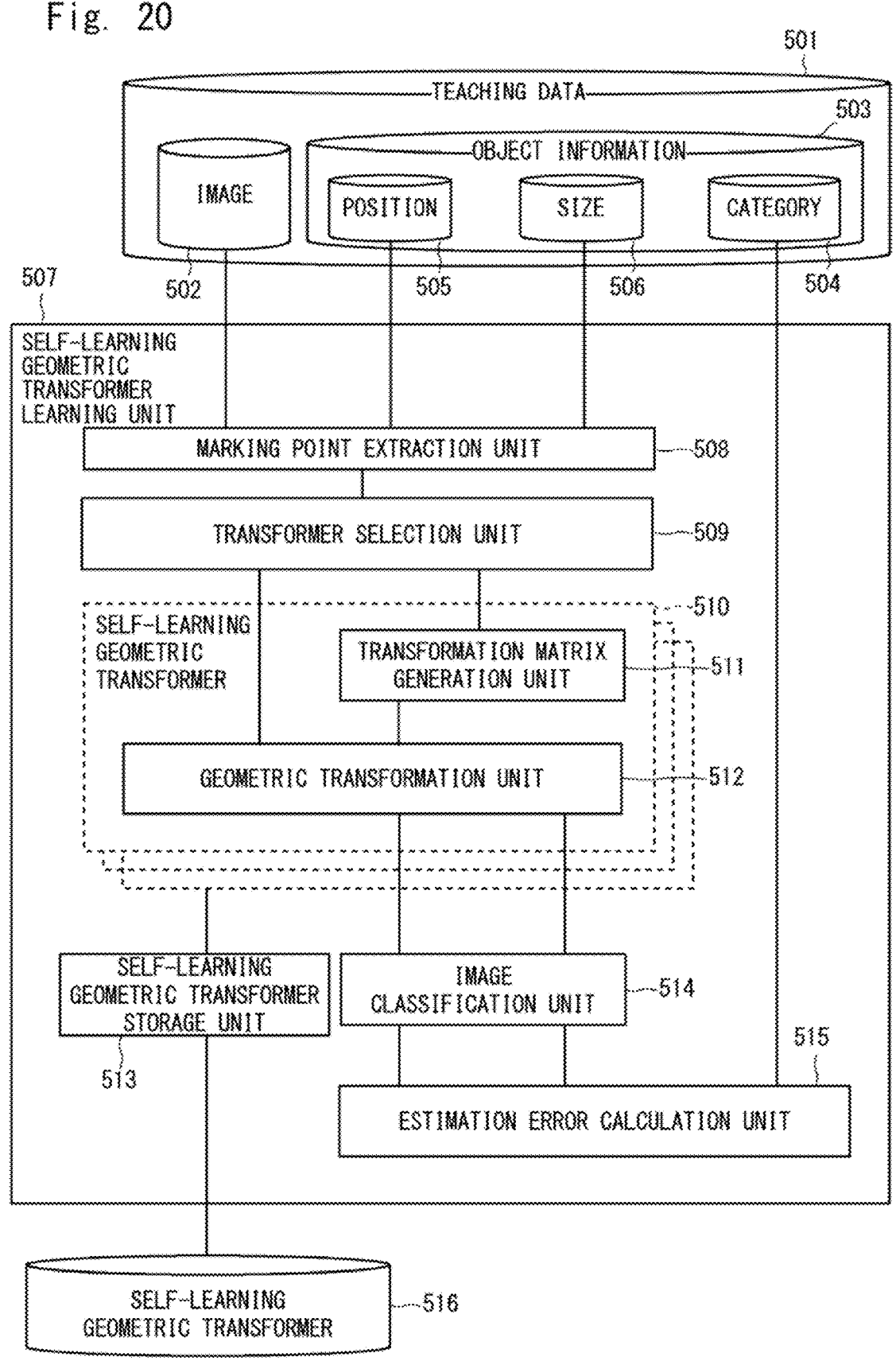
FIG. 20 is a functional block diagram illustrating a self-learning geometric transformer learning unit for each category.
Figure 21:
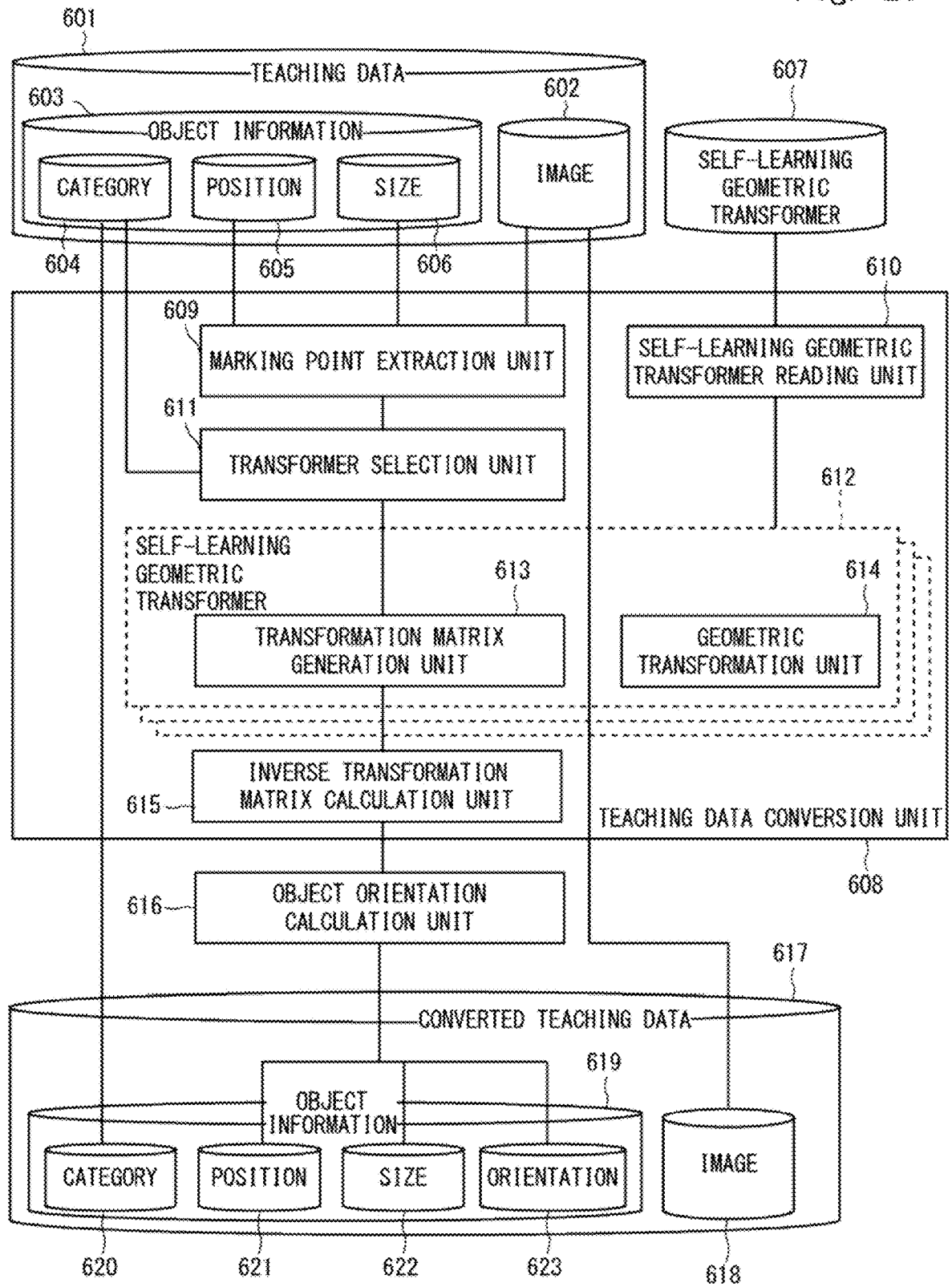
FIG. 21 is a functional block diagram illustrating a teaching data conversion unit for each category.

Modified point in the configuration is described. As illustrated in FIGS. 20 and 21, self-learning geometric transformers 510 and 612 are prepared for each detection target category, and transformer selection units 509 and 611 are added. Specifically, a self-learning geometric transformer different for each category type is used.

Figure 22:
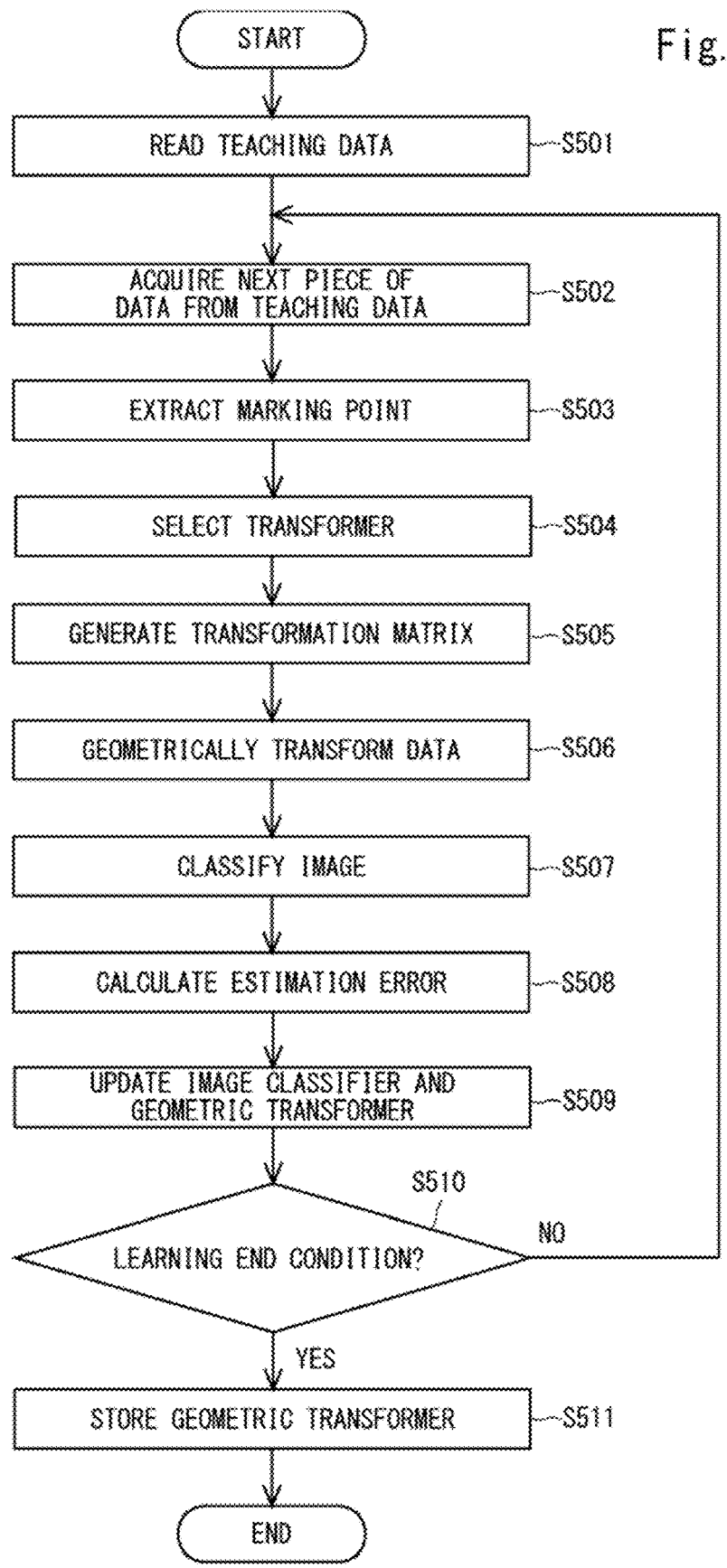
FIG. 22 illustrates an operation flow of the self-learning geometric transformer learning unit for each category.
Figure 23:
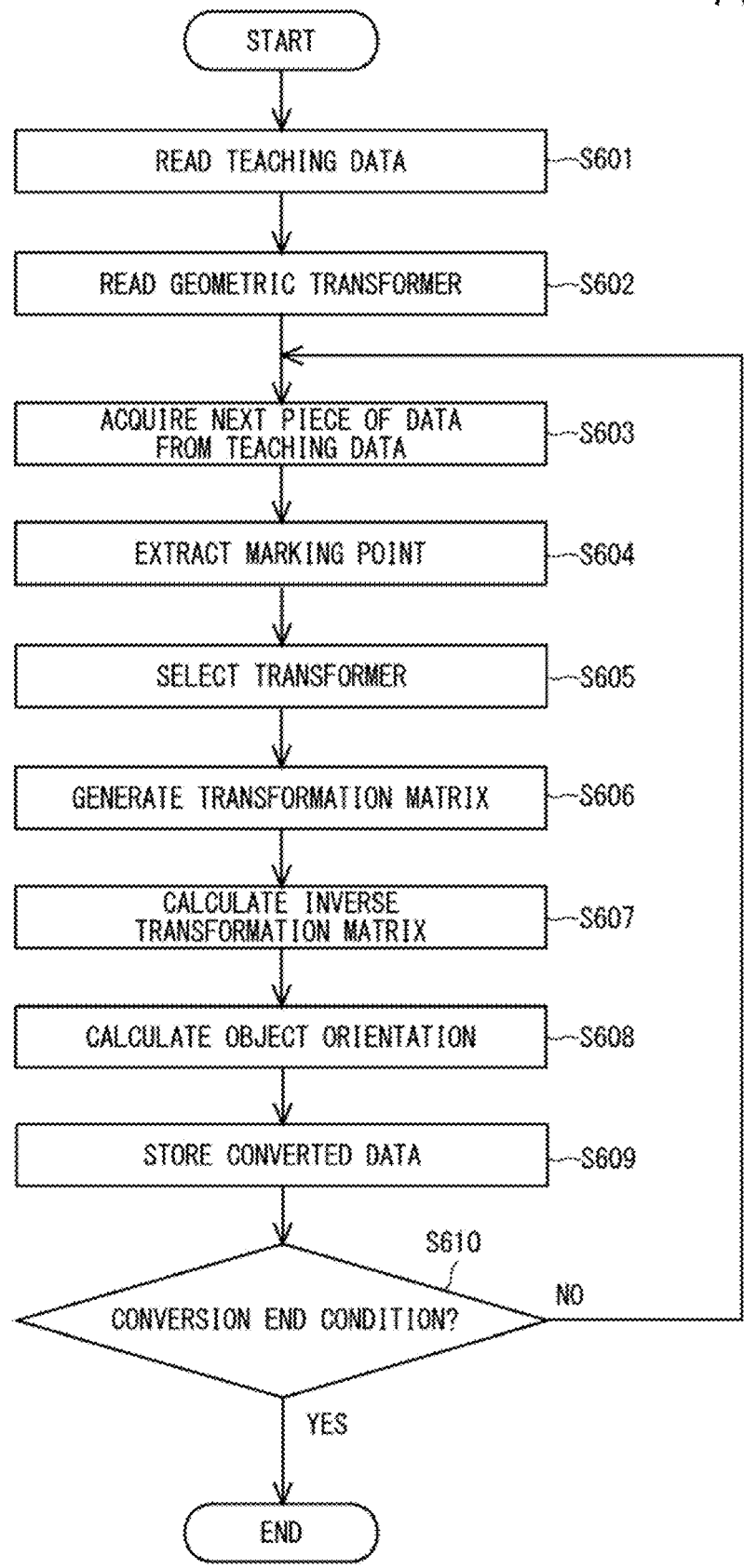
FIG. 23 is a functional block diagram illustrating the teaching data conversion unit for each category.

Modified point in the operation is described. As illustrated in FIGS. 22 and 23, steps S504 and S605 are added, and the storage processing and the reading processing of the transformers are changed as in steps S511 and S602, and a transformer relevant to a category of an target object is selected.

In step S504, the transformer selection unit 509 selects a transformer of the target category, and subsequent processing proceeds. The transformer selection unit 509 identifies a category for each object by referring to a category included in object information of teaching data, and selects the self-learning geometric transformer 510 that is relevant to the identified category.

In step S511, a self-learning geometric transformer storage unit 513 stores all the self-learning geometric transformers 510.

In step S602, a self-learning geometric transformer reading unit 610 reads all the self-learning geometric transformers 612.

In step S605, the transformer selection unit 611 selects a transformer of a target category, and subsequent processing proceeds. The transformer selecting unit 611 identifies a category for each object by referring to a category included in object information of teaching data, and selects the self-learning geometric transformer 612 that is relevant to the identified category.

Modification Example 2

Since results of rotation are the same for 0° rotation and 360° rotation but values themselves are different, high accuracy may not be achieved when such object orientation information is included in teaching data.

Figure 24:
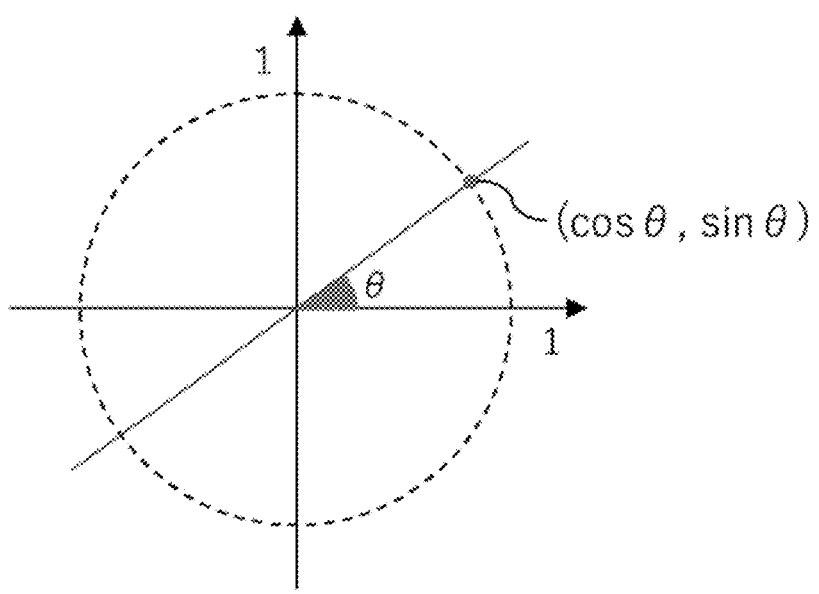
FIG. 24 is an explanatory diagram illustrating conversion from an angle to a coordinate value.

Therefore, an orientation of an object may be handled not as a value θ of an angle but in a form of a coordinate value (cos θ, sin θ) relevant to the orientation on a unit circle as illustrated in FIG. 24. In this case, as one example, both 0° and 360° have the same coordinate values (1, 0). As a result, accuracy of detection by the object detection unit 119 can be expected to be improved.

In the above-described examples, the program can be stored and provided to a computer by using various types of non-transitory computer readable medium. The non-transitory computer readable medium includes various types of tangible storage medium. An example of the non-transitory computer readable media includes a magnetic recording medium (for example, a flexible disk, a magnetic tape, and a hard disk drive), a magneto-optical recording medium (for example, a magneto-optical disk). The example of the non-transitory computer readable media further includes a read only memory (CD-ROM), a CD-R, a CD-R/W, a semiconductor memory (for example, a mask ROM. The example of the non-transitory computer readable medium further includes a programmable ROM (PROM), an erasable PROM (EPROM), a flash ROM, and a random access memory (RAM). Further, the program may also be provided to the computer by various types of transitory computer readable medium. An examples of the transitory computer readable medium includes an electrical signal, an optical signal, and an electromagnetic wave. The transitory computer readable medium may provide the program to the computer via a wired communication path such as an electrical wire, an optical fiber, and the like, or via a wireless communication path.

REFERENCE SIGNS LIST

1000 TEACHING DATA CONVERSION DEVICE
1001 STORAGE UNIT
1002 CALCULATION UNIT
1003 GENERATION UNIT

The invention claimed is:

1. A teaching data conversion device comprising:
a memory storing instructions; and
a processor configured to execute the instructions to:
store a learned first neural network learned in such a way as to output, when an object image being an image of an object specified based on object information of first teaching data including an image and the object information including a category, a position, and a size of the object in the image, is input, a geometric transformation parameter relevant to the object image;
calculate an orientation of the object, based on the geometric transformation parameter being output from the first neural network; and
generate, by adding the orientation of the object to the first teaching data, second teaching data including the image and object information including a category, a position, a size, and the orientation of the object included in the image,
wherein the orientation of the object is represented by a coordinate value on a unit circle relevant to the orientation.

2. The teaching data conversion device according to claim 1, wherein the processor is configured to execute the instructions to further generate the first neural network by learning,
wherein the processor geometrically transforms the object image, based on the geometric transformation parameter being output from the first neural network by inputting the object image to the first neural network, calculates an estimation error between a category being output from a second neural network by inputting the geometrically transformed object image to the second neural network and a category included in the first teaching data, and learns the first neural network by updating a weighting coefficient of each of the first neural network and the second neural network in such a way that the estimation error becomes small.

3. The teaching data conversion device according to claim 1, wherein the geometric transformation parameter includes a parameter for rotating the object image.

4. The teaching data conversion device according to claim 3, wherein the geometric transformation parameter further includes a parameter for performing at least one of enlargement, reduction, and parallel translation of the object image.

5. The teaching data conversion device according to claim 1, wherein the geometric transformation parameter is a parameter for affine transformation of the object image.

6. The teaching data conversion device according to claim 1, wherein
the geometric transformation parameter is a geometric transformation matrix, and the processor calculates the orientation of the object, based on an inverse geometric transformation matrix being an inverse matrix of the geometric transformation matrix.

7. A teaching data conversion method performed by a computer and comprising:
   storing a learned first neural network learned in such a way as to output, when an object image being an image of an object identified based on object information of first teaching data including an image and the object information including a category, a position, and a size of the object included in the image, is input, a geometric transformation parameter relevant to the object image;
   calculating an orientation of the object, based on the geometric transformation parameter being output from the first neural network; and
   generating, by adding the calculated orientation of the object to the first teaching data, second teaching data including an image and object information including a category, a position, a size, and the orientation of the object included in the image,
   wherein the orientation of the object is represented by a coordinate value on a unit circle relevant to the orientation.

8. A non-transitory storage medium storing a program executable by the computer to perform the teaching data conversion method according to claim 7.

* * * * *